Patented May 9, 1939

2,157,351

UNITED STATES PATENT OFFICE 2,157,351

SENSITIZING DYES FOR PHOTOGRAPHIC EMULSIONS

Wilhelm Schneider and Ernst Bauer, Dessau in Anhalt, Germany, assignors to Agfa Ansco Corporation, Binghamton, N. Y., a corporation of New York No Drawing. Application December 26, 1935, Serial No. 56,240. In Germany December 28, 1934

10 Claims. (Cl. 260—328)

This invention relates to sensitizing dyes for photographic materials.

One of its objects is to provide a silver halide emulsion the sensitivity of which is raised over the range of wave lengths to which the emulsion is normally sensitive. Another object are the dyes incorporated in the emulsion. Further objects will be seen from the detailed specification following hereafter.

Success has not hitherto attended efforts to introduce into fluoresceine sulfur in place of the oxygen which unites the two nuclei. In all cases the sulfur enters the fluoresceine molecule in a side chain.

According to this invention a photographic silver halide emulsion is sensitized by incorporation of dyes. The dyes are compounds similar to fluoresceine and are thio-, seleno- and telluroxanthone dyes, made by condensing a m-dihydroxydiphenyl-sulfide or -selenide or -telluride with a carboxylic acid or a derivative thereof having a similar function such as the acid chloride, the anhydride, and the acid amide.

The dyestuffs obtainable in accordance with the invention having the following general formula

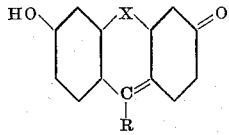

wherein

X=S, Se, Te.

and

R=alkyl, aralkyl or aryl.

Carboxylic acids applicable for the condensation are, for example, phthalic anhydride and the like. Instead of the carboxylic acid a derivative having like function may be used, for example, benzotrichloride.

The process may be conducted in the presence or absence of a condensing agent and as such agents may be used, for example, zinc chloride or sulfuric acid.

The compounds resembling fluoresceine which are obtainable by the invention may be converted into valuable photographic sensitizing dyestuffs by halogenation.

For making the telluriferous dyestuffs one may start from the meta-dimethoxydiphenyl-mercury-compound, which may be converted into the meta - dimethoxydiphenyltelluride by reaction with a suitable proportion, say one equivalent, of finely pulverized tellurium at 200° C. This dimethoxy-derivative is demethylated and then condensed with benzo-trichloride. The telluroxanthone-dyestuff thus formed is somewhat unstable. The solutions of the dyestuffs are very readily bleached by light.

The following examples illustrate the invention:

*Example 1.*—The potassium salt of meta-methoxythiophenol is condensed with the equivalent quantity of meta-iodoanisol at 200° C. with the addition of copper powder. The dimethoxy-diphenylsulfide thus obtained is demethylated by any known method and condensed with the equivalent proportion of benzotrichloride at 100° C. to produce a dyestuff which has the following structural formula:

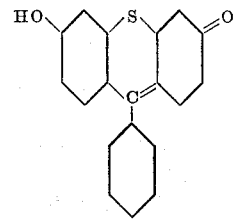

Absorption maximum 525$\mu\mu$.

By iodinating this dyestuff there is obtained a tetraiodo-product which may be recrystallized from alcohol. It has the following constitution:

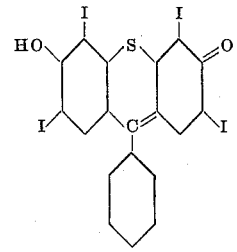

The alcoholic solution of the dye has an absorption maximum at a wave length of about 535$\mu\mu$.

By incorporation of the dye a silver halide emulsion is sensitized to waves from about 520μμ to 600μμ with a maximum at about 570μμ.

*Example 2.*—Dihydroxydiphenylsulfide is condensed with the equivalent proportion of phthalic anhydride in sulfuric acid of about 80 per cent strength by heating for 1 hour at 150° C. The dyestuff thus obtained has the following constitution:

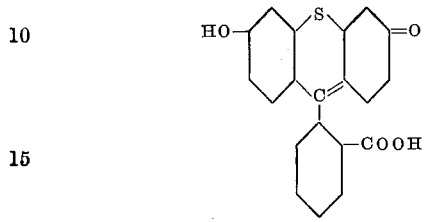

The tetraiodo-product from this dyestuff has the following data of sensitization:

The alcoholic solution of the dye has an absorption maximum at a wave length of about 540μμ.

By incorporation of the dye a silver halide emulsion is sensitized to waves from about 530μμ to 590μμ with a maximum at about 565μμ.

*Example 3.*—The potassium salt of meta-methoxyselenophenol is condensed in presence of copper power at 200° C. with the equivalent proportion of meta-iodoanisol. The product is demethylated by fusion with aniline hydrochloride or by heating it with a solution of the equivalent proportion of ethyl-magnesiumiodide in xylenol at 80° C. The dihydroxydiphenylselenide thus obtained is condensed with benzotrichloride. The dyestuff has the following structural formula:

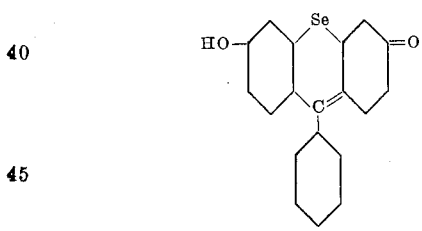

Absorption maximum about 540μμ.

By iodinating this dyestuff in methanol solution with the calculated proportion of iodine + iodic acid a dyestuff of the following formula is obtained:

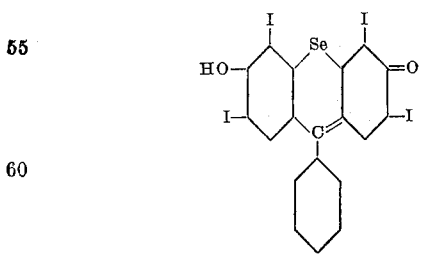

The alcoholic solution of the dye has an absorption maximum at a wave length of about 552μμ.

By incorporation of the dye a silver halide emulsion is sensitized to waves from about 520μμ to 610μμ with a maximum at about 580μμ.

A process of sensitizing silver halide emulsions with dyestuffs of this invention is similar to that used in the case of the application of already known dyestuffs for this purpose.

What we claim is:

1. A process of producing the dye

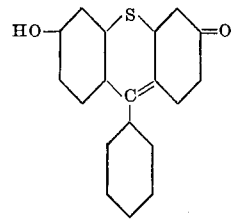

which comprises condensing dihydroxydiphenyl sulfide with the equivalent proportion of benzotrichloride with the application of heat.

2. A process of producing the dye

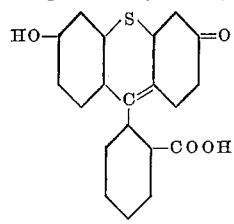

which comprises condensing a mixture of dihydroxydiphenyl-sulfide and the equivalent proportion of phthalic anhydride in sulphuric acid of about 80 per cent strength with the application of heat.

3. A process of producing the dye

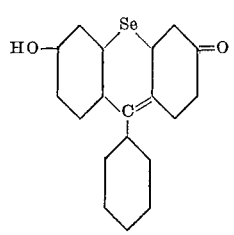

which comprises condensing dihydroxydiphenylselenide with the equivalent proportion of benzotrichloride with the application of heat.

4. A dye corresponding with the formula

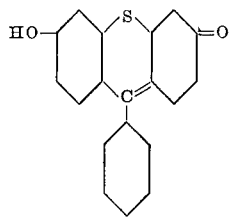

having an absorption maximum at about 525μμ.

5. A dye corresponding with the formula

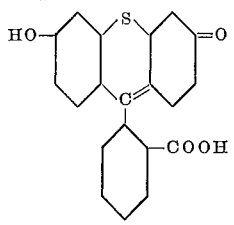

6. A dye corresponding with the formula

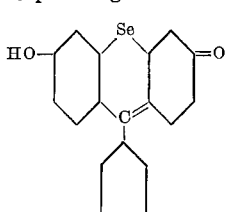

having an absorption maximum at about 540μμ.

7. In a process of producing thio-xanthone dyes of the following formula:

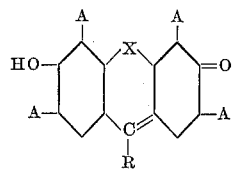

wherein X is a member of the group consisting of S, Se and Te, wherein R is a monocyclic aryl radical and wherein A is a member of the group consisting of hydrogen and halogen, the step which comprises condensing a substance selected from the class consisting of dihydroxydiphenyl-sulfide, -selenide and -telluride with a compound selected from the group consisting of monocyclic aromatic carboxylic acids their anhydrides and halides with the application of heat.

8. A dye corresponding with the formula:

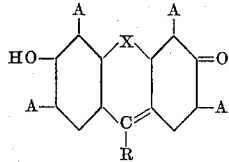

wherein X is a member of the group consisting of S, Se and Te, wherein R is a monocyclic aryl radical and wherein A is a member of the group consisting of hydrogen and halogen.

9. A process of producing thio-, seleno-, and telluroxanthone dyes corresponding with the general formula

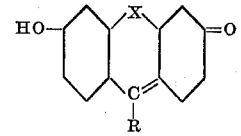

wherein X stands for a member of the class consisting of S, Se and Te and R stands for a monocyclic aryl radical which comprises condensing a substance selected from the class consisting of dioxydiphenyl-sulfide, -selenide and -telluride with a compound selected from the group consisting of monocyclic aromatic acids, their anhydrides and halides with the application of heat.

10. A dye corresponding with the formula

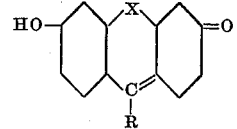

wherein X is for a member of the group consisting of S, Se and Te and wherein R is a monocyclic aryl radical.

WILHELM SCHNEIDER.
ERNST BAUER.